United States Patent [19]

Treiber

[11] 4,239,384
[45] Dec. 16, 1980

[54] METHOD AND APPARATUS FOR AUTOMATICALLY RECOGNIZING PHOTOGRAPHIC ORIGINALS UNSUITABLE FOR COPYING

[75] Inventor: Helmut Treiber, Munich, Fed. Rep. of Germany

[73] Assignee: AGFA-Gevaert AG, Leverkusen, Fed. Rep. of Germany

[21] Appl. No.: 966,314

[22] Filed: Nov. 29, 1978

[30] Foreign Application Priority Data

Dec. 1, 1977 [DE] Fed. Rep. of Germany ....... 2753632

[51] Int. Cl.³ ...................... G03B 27/52; G01N 21/59
[52] U.S. Cl. ........................................ 355/68; 355/77; 250/559; 356/444
[58] Field of Search ...................... 355/68, 83, 77, 41, 355/38, 35; 356/443, 444; 250/559, 571

[56] References Cited

U.S. PATENT DOCUMENTS

| | | | |
|---|---|---|---|
| 3,690,765 | 9/1972 | Rickard et al. .................... | 355/68 X |
| 3,734,611 | 5/1973 | Knapp et al. ...................... | 355/68 X |
| 3,790,275 | 2/1974 | Huboi et al. ...................... | 356/444 X |
| 3,981,579 | 9/1976 | Weinert et al. .................... | 355/41 X |
| 3,984,184 | 10/1976 | Pflugbeil ........................... | 355/41 X |
| 4,099,064 | 7/1978 | Grossman ......................... | 355/68 X |

*Primary Examiner*—Richard A. Wintercorn
*Assistant Examiner*—W. J. Brady
*Attorney, Agent, or Firm*—Michael J. Striker

[57] ABSTRACT

A negative whose printability is to be automatically ascertained is subdivided into a central zone, a foreground zone, and a background zone. Whole-zone density signals are produced for the foreground and background zones, and the central zone is scanned to generate a maximum-density signal indicating the density of the maximum-density point within the central zone. The negative is rejected for being underexposed when both of two conditions are met: first, the larger of the foreground and background whole-zone density signals fails to exceed a first limit value; and second, the difference between the central-zone maximum-density signal, on the one hand, and the smaller of the foregound and background whole-zone density signals, on the other hand, fails to exceed a second limit value. The negative is rejected as overexposed when the average of the foreground and background whole-zone density signals fails to exceed a third limit value, irrespective of the density of the central zone. The negative is rejected as containing a meaningless motif, e.g., an adhesive sticker applied to the negative, when the central-zone maximum-density signal exceeds a fourth limit value, the density corresponding to the fourth limit value being higher than the density corresponding to the third limit value.

23 Claims, 2 Drawing Figures

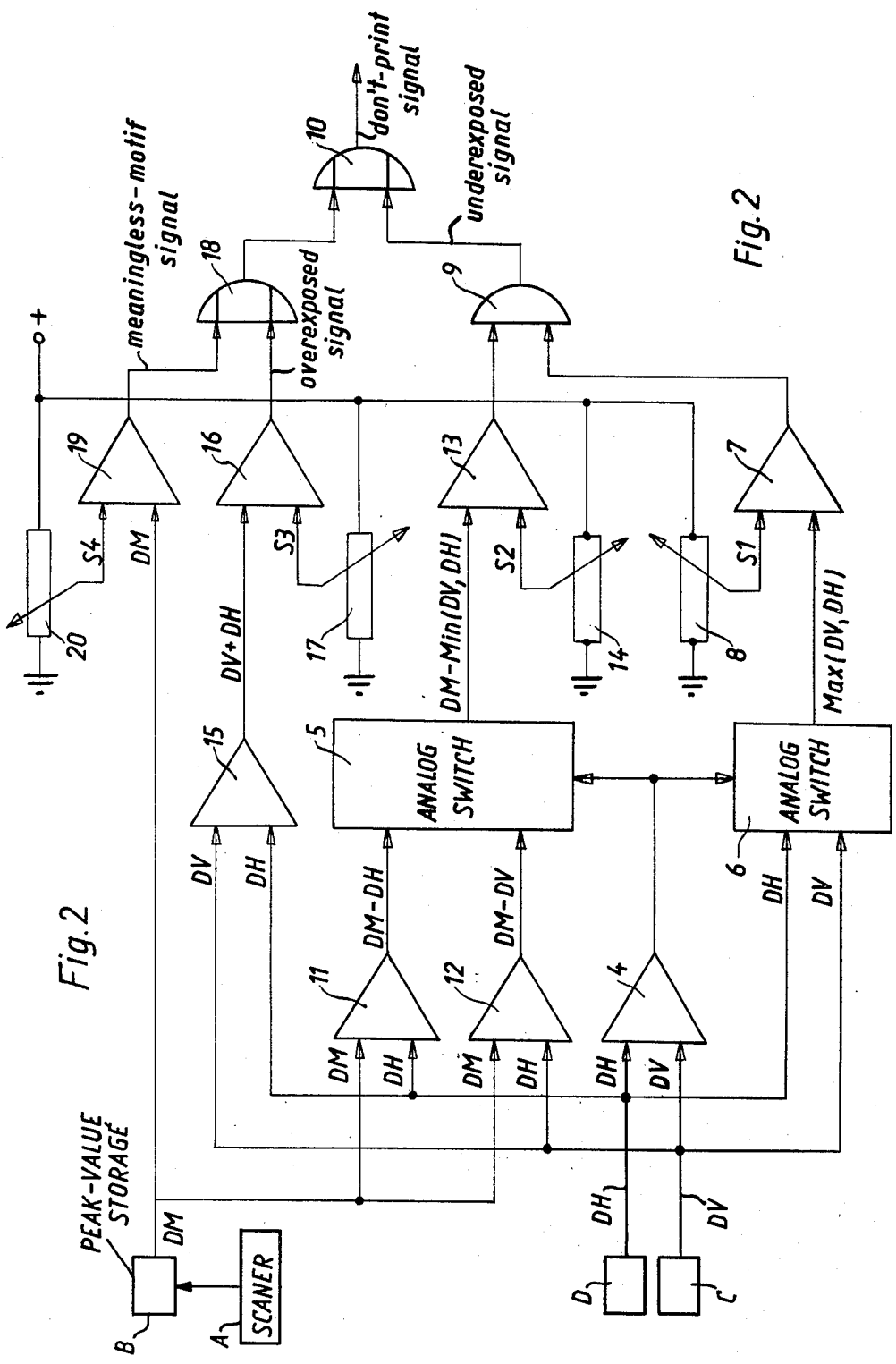

METHOD AND APPARATUS FOR AUTOMATICALLY RECOGNIZING PHOTOGRAPHIC ORIGINALS UNSUITABLE FOR COPYING

BACKGROUND OF THE INVENTION

The present invention concerns methods and apparatuses for automatically recognizing photographic originals, e.g., negatives in a long strip of photographic negatives, which are unsuitable for copying. In particular, the present invention relates to methods and apparatuses of that type in which the original is scanned or measured with respect to density on a zonewise basis.

It is well known, in connection with automatic photographic printers and prereaders, to take measures intended to prevent markedly under- or overexposed originals, e.g., negatives, from being copied or printed. Merely by way of example, U.S. Pat. No. 3,690,765 discloses a photographic printing or copying machine in which the average transparency of a sizable fraction of the surface area of each individual original is photoelectrically measured. The resultant measurement signal is then compared against an upper and a lower limit value, and copying occurs only if the measurement signal falls in the range intermediate the two limit values.

Federal Republic of Germany published patent application DT-OS No. 22 17 680 discloses a system in which the transparencies of a number of predetermined regions or zones of the original are individually measured. Copying is automatically prevented if all of these plural measurement signals fall below a certain lower limit value, or if all of the measurement signals exceed a certain upper limit value. I.e., copying is automatically prevented if the negative being measured is underexposed all over its surface or overexposed all over its surface. If even one of the plural measurement signals falls within the range intermediate the upper and lower limit values, copying is automatically commanded.

Automatic evaluating techniques of the types just mentioned are fraught with ambiguity. Firstly, with such techniques, it is extremely difficult to discriminate between, on the one hand, a negative which is underexposed and, on the other hand, a negative which is actually suitable for printing but exhibits low image contrast. In particular, the selection of the aforementioned lower limit value determines and limits the possibility of making such a discrimination, but the selection is made difficult, for example, by the fact that the subject filmed, i.e., as opposed to its background, may occupy only a relatively small fraction of the surface area of the negative. Secondly, the density of entirely unexposed film may exhibit considerable variation, depending for example upon manufacturer, aging and the film-development technique employed, so that often the fog density of an unexposed negative in a particular film strip can be higher than the average for the many film strips processed. Research has established that with known techniques such as described above the percentage of negatives unsuitable for printing but nevertheless printed, and likewise the percentage of negatives suitable for printing but nevertheless not printed, is unacceptably high. In particular, there is excessive printing of negatives on which adhesive stickers, or the like, have been applied, such negatives bearing so-called meaningless motifs and obviously being unsuitable for printing.

SUMMARY OF THE INVENTION

It is the general object of the invention to provide a method and apparatus for automatically distinguishing between originals which are suitable and not suitable for copying, of the general type discussed above, but discriminating more accurately between printable and not printable originals.

In accordance with the present invention, each original is subdivided into a central zone presumed to contain the subject of interest, and the remainder of each original is divided into foreground and background zones.

Underexposed negatives can then be recognized as follows: The density of the foreground zone and of the background zone are separately determined on a whole-zone basis, and the higher of the two densities is compared against a first limit value. The density of the central zone is evaluated by means of scanning, preferably pointwise scanning along successive scanning lines, or the like, and the maximum density value of the central zone is ascertained. The difference between this maximum density value, on the one hand, and the smaller of the two density values (i.e., the foreground and background density values), on the other hand, is then compared against a second limit value. If neither of the two limit values is exceeded in these two comparisons, the negative is automatically deemed underexposed and not suitable for printing.

Overexposed negatives can be recognized as follows: The density of the foreground zone and of the background zone are determined on a whole-zone basis, and their average value is ascertained. The average value is compared against a third limit value, and if the third limit value is exceeded the negative is automatically deemed overexposed and not suitable for printing. The density of the central zone is preferably not considered.

Negatives provided with adhesive stickers, or other so-called meaningless motifs, in their central regions can be recognized as follows: The central zone is subjected to scanning, e.g., pointwise scanning performed along successive scan lines, and the maximum density value of the central zone is ascertained. This maximum density value is then compared against a fourth limit value, and if the fourth limit value is exceeded, the central zone of the negative is automatically deemed to contain a so-called meaningless motif.

The present invention considerably increases the frequency with which negatives are automatically judged to be blank or underexposed, thereby considerably decreasing the number of prints made. At the same time, however, the number of thusly rejected negatives improperly rejected tends to stay extremely low. Also, overexposed negatives are automatically recognized with increased reliability and accuracy. In particular, meaningless motifs such as adhesive stickers, leading portions of films, or negatives provided with data markings are detected and the negatives in question are reliably judged as unsuitable for printing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 depicts an exemplary embodiment of a circuit employed to evaluate the information derived from the zones established in FIG. 1.

DESCRIPTION OF THE PREFERRED EMBODIMENTS

Figure 1:
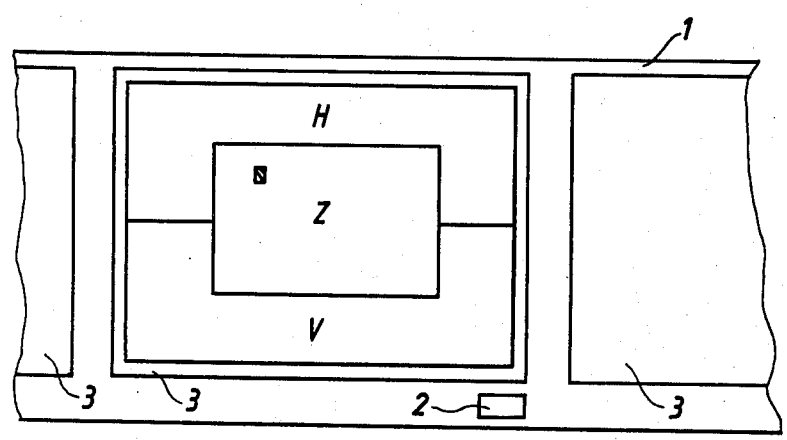
FIG. 1 depicts one exemplary zonal subdivision of the surface of an original.

In FIG. 1, numeral 1 denotes an original provided with a positioning perforation 2. A negative 3 of the original 1 is subdivided at an evaluating station into three zones, namely a central zone Z, a foreground zone V and a background zone H. The subdivision into zones can be accomplished in a variety of conventional ways, for example using a compartmented housing as in U.S. Pat. No. 3,690,765. Here, the central zone Z is of rectangular form and is located approximately at the exact center of the negative, whereas the foreground and background zones are of U-shape and embrace the central zones from below and above.

The density evaluation of the foreground zone V and of the background zone H is preferably performed on a simple whole-zone basis, e.g., involving no scanning mechanism. For example, each of these two zones V, H can be associated with a respective light source and photoelectric detector, the light from the light source passing through the whole of the respective zone and being in its entirety directed onto the respective detector, so that the latter produces an output signal simply indicating the total or average density of the respective zone. Of course, it would also be possible, if for any reason desired, to scan the foreground and/or background zones and develop a signal equivalent to, or approximately equivalent to, a whole-zone density signal by applying the output signal of the scanner to an integrator, totalizer, or the like.

The density of the central zone Z is evaluated using a scanner, of any conventional type, preferably of the type employing a scanning spot which covers the whole surface of the zone Z in accordance with a regular scanning sequence, e.g., along successive scan lines. The scanner is used to ascertain the maximum density value of the central zone Z, i.e., the density of the maximum-density point or spot within this zone. To this end, the output signal from the scanner can, for example, be applied to a peak-detecting and storing circuit, such as conventionally used when the maximum density of a negative is to be ascertained. The scanning spot employed should, of course, be as nearly point-sized as possible, i.e., for accuracy.

Persons skilled in the art will appreciate that systems which automatically evaluate the suitability of photographic negatives for printing can never perform perfectly, nor indeed as well as a skilled and experienced human evaluator. Partly, of course, this is because there is, even for a human evaluator, no absolute objective standard for printing suitability. However, in the case of automatic evaluation, the lack of absolute standards of printability is very much compounded by the problems discussed earlier, and it is the goal of an automatic printability evaluating technique to increase the probability that improper rejection of negatives for printing will be avoided. Also, it will be understood that, in general, the accuracy of the automatic evaluation is increased by the number of empirically determined printability criteria programmed into the system. The present invention contemplates certain main criteria, but it will be understood that equivalent criteria and/or auxiliary criteria can be employed.

The criterion here employed for recognition of underexposed negatives involves the following considerations:

Firstly, the whole-zone densities of the foreground and background zones should be ascertained, followed by a determination of whether, for example, one of these two density values exceeds a predetermined minimum limit value S1. For example, after the two density values are ascertained, one can ascertain whether the foreground density DV or the background density DH is the greater, with the greater one of the two densities being compared against limit value S1. If the limit value S1 is exceeded, then this informs the system that the negative is not to be deemed underexposed.

In contrast, if neither of the two density values DV and DH exceeds the limit value S1, then a further evaluation can be performed. Underlying the further evaluation can be, for example, the assumption that a negative having low density in both the foreground and background zones, if it is in fact nevertheless suitable for printing, must exhibit at least a certain small amount of image contrast. Usually, such contrast should be looked for in the central zone of the negative. Accordingly, it is preferred in accordance with the present invention to scan the central zone Z, e.g., using a point-like scanning spot, and to ascertain the maximum density value of the central zone. Then the difference between the latter value, on the one hand, and the smaller of the two peripheral-zone density values DV, DH, on the other hand, is compared against a second limit value S2. If such difference exceeds limit value S2, the system automatically deems the negative not to be underexposed. If, on the other hand, such difference falls short of limit value S2, then the negative is deemed underexposed and it is not copied, i.e., provided that neither of the two density values DV, DH exceed the first limit value S1.

Recognition of overexposed originals inherently can be performed somewhat more simply, mainly because in that case the problem of fog density or varying density of entirely unexposed film plays a less important role. Thus, for example, it can be sufficient to measure the whole-zone transparencies of the foreground and background zones and then, advantageously, form the average value of the two, the latter then being compared against a third limit value S3. If limit value S3 is exceeded, the negative is automatically deemed overexposed and not printed.

When using this latter technique, it is possible, and indeed preferable, not even to consider the central zone Z. For example, especially in the case of flash or artificial-lighting exposures, it may happen that image details in the central zone of the negative are overexposed, whereas the negative considered as a whole is worth printing. On the other hand, if the region of overexposure additionally extends out into the foreground and background zones, then it is relatively safe to conclude that the negative as a whole is not worth printing.

A final important consideration is the so-called meaningless motifs referred to earlier. These can, for example, involve negatives onto which adhesive stickers or the like have been applied, the leading ends of films fed into a darkroom whose first picture may already be located at a film-splice location, or data markings deliberately applied to negatives at an evaluating station or prereader preliminary to printing. In order to recognize those situations, the invention contemplates ascertaining whether the maximum density value in the central zone Z exceeds, by at least a predetermined amount, the limit value S3 referred to above in connection with overexposure recognition. Accordingly, it is preferred to compare the maximum density value of central zone Z against a fourth limit value S4, which is greater than the limit value S3. If limit value S4 is exceeded, printing is automatically prevented.

FIG. 2 depicts a system for performing the automatic evaluations discussed above.

The system depicted in FIG. 2 comprises a scanner A operative for scanning the central zone Z using a scanning spot which follows a regular scanning sequence. The output signal furnished by scanner A is applied to a peak-value detector and storage B which produces at its output a signal DM indicative of the density of the maximum-density spot encountered within central zone Z. Of course, the maximum-density signal DM is not properly available until the scanning of zone Z has been completed, and persons skilled in the art will understand that the remainder of the circuitry illustrated in FIG. 2 can be kept disabled until the maximum-density signal DM is ready for processing.

Whole-zone density measuring units C and D furnish the signals DV and DH already referred to, respectively indicating the whole-zone density of the foreground zone V and of the background zone H.

A first comparator 4 receives the two whole-zone density signals DV, DH and, in dependence upon which is greater, produces one or the other of two different output signals. The output signal from comparator 4 is applied to the control input of an analog voltage switch 5 and of another such analog voltage switch 6. The two inputs of switch 6 likewise receive the two signals DV, DH and, under the control of the output signal from comparator 4, the larger of the two signals DV, DH is transmitted to the output of switch 6. This output signal Max(DV, DH) is applied to one input of a comparator 7, the other input of which receives a voltage from an adjustable resistor 8 serving to establish the level of limit value S1 discussed above. The output signal of comparator 7 is applied to one input of an AND-gate 9, whose output in turn is connected to one input of an OR-gate 10.

The maximum density signal DM is applied to the upper input of each one of two difference amplifiers 11, 12. The lower inputs of the latter respectively receive the signals DH and DV, and the two difference amplifiers furnish at their outputs signals corresponding to DM−DH and DM−DV, respectively. One or the other of these two difference signals is transmitted to the output of switch 5, depending upon the output signal produced by comparator 4. In particular, the signal furnished at the output of switch 5 is DM−DH, if DH is smaller than DV; if DV is smaller than DH, then the difference signal transmitted to the output of switch 5 is DM−DV.

The output signal (either DM−DH or DM−DV) of switch 5 is transmitted to one input of a comparator 13, whose other input receives a voltage from an adjustable resistor 14 serving to establish the level of the second limit value S2 discussed above. The output of comparator 13 is connected to the other input of AND-gate 9.

The part of the FIG. 2 circuitry thus far described serves to identify negatives which are to be deemed underexposed.

If the greater of the two zonal density signals DH, DV exceeds the limit value S1 of comparator 7, the latter produces an output "0" signal, which is applied to the lower input of AND-gate 9, thereby preventing the appearance of a "1" or don't-print signal at the output of OR-gate 10.

If the greater of the two zonal density signals DH, DV fails to exceed the limit value S1 of comparator 7, the latter applies an output "1" signal to the lower input of AND-gate 9, and a don't-print output "1" signal will then be produced, or not, depending upon the signal applied to the upper input of AND-gate 9.

The signal applied to the upper input of AND-gate 9 is derived as follows: The output of switch 5 furnishes the larger of the two difference signals applied to the input thereof, namely DM−Min(DV, DH), and such signal is compared against limit value S2 in comparator 13. If this difference signal is lower than limit value S2, comparator 13 produces an output "1" signal, which is transmitted to the upper input of AND-gate 9, and accordingly a "1" or don't-print signal appears at the output of OR-gate 10.

The circuitry of FIG. 2 additionally comprises an adder 15, at whose output is produced a signal proportional to the average of the density signals DV and DH. This average signal is applied to the upper input of a comparator 16, whose lower input is connected to an adjustable resistor 17 serving to establish the level of limit value S3. The output of comparator 16 is connected to the lower input of an OR-gate 18. Finally, the maximum density signal DM is applied to the lower input of a comparator 19, whose upper input is connected to an adjustable resistor 20 serving to establish the level of limit value S4. The output of comparator 19 is connected to the upper input of the OR-gate 18, the output of the latter being connected to the upper input of OR-gate 10.

If now the average of DV and DH exceeds limit value S3, comparator 16 produces an output "1" signal; otherwise, and output "0" signal. If the maximum density signal DM exceeds limit value S4, comparator 19 produces an output "1" signal.

Accordingly, one or the other or both of the two comparators 16, 19 produce output "1" signals for overexposure and/or for so-called meaningless motifs, and such "1" signal or signals are transmitted via OR-gate 18 to the upper input of OR-gate 10, resulting in a don't-print "1" signal at the output of the latter.

It will be appreciated that the circuit shown in FIG. 2 comprises three branches, one feeding into the lower input of OR-gate 10, one feeding into the lower input of OR-gate 18, and the third feeding into the upper input of OR-gate 18, and serving to reject negatives for printing from respective ones of three different viewpoints elucidated above. It is presently preferred that all three branches be employed. This is appropriate inasmuch as the most difficult determination, namely underexposure, is predicated upon the zonal subdivision Z, V, H, the whole-zone density measurement for the two zones V, H and the scanning of central zone Z; i.e., given this zonal subdivision, it is extremely convenient then to recognize overexposure and so-called meaningless motifs using the means illustrated and sharing then the scanner A and the two whole-zone light measuring devices C,D. In principle, however, each of these three branches, and the techniques they embody could be employed separately, e.g., in conjunction with different techniques for evaluating the other one or ones of the three factors discussed above, and self-evidently could be used in conjunction with techniques involving still further factors. Thus, for example, the inventive technique for ascertaining underexposure could be used in conjunction with an overexposure-evaluating technique quite different from that employed in FIG. 2, although this is not presently preferred.

Also, it will be understood that exactly the zonal subdivision depicted in FIG. 1 need not be resorted to. For example, whereas in FIG. 1 the foreground and background zones V and H together add up to the entire surface of negative 3 minus only the central zone Z, the sum of the foreground and background zones could be less than this, provided that the requisite foreground and background information be generated.

In connection with this latter point, although it is presently preferred to have simply one simple foreground zone and one simple background zone, in principle the zonal subdivision could be made somewhat more complex, e.g., by dividing the foreground and background zones into respective left and right subzones, or even into left, middle and right subzones, in which event, for example, the zonal density signals DV and DH could each be constituted by the largest one of the resulting two or three subzonal density signals for the criterion involving comparator 7, and by the smallest of these for the criterion involving comparator 13. With such, somewhat more complex alternatives, the information derived from the central zone Z would still be derived from a scanner, whereas the information derived from the foreground and background zones would continue to be essentially zonal in character. The information derived from central zone Z is non-zonal in character, because the image content of zone Z is broken down into the smallest possible constituent elements, e.g., each the size of a point-like scanning spot, whereas the information derived from the foreground and background zones is zonal in character, because it does not require a breakdown of image content into the smallest possible constituent surface elements. However, as mentioned earlier, although breakdown of the image content of zones V and H into point-like constituent surface elements, e.g., using a scanning beam, is unnecessary for the information which is to be derived from such zones, a scanner could be used to generate the whole-zone density information, if for any reason desirable, merely by applying the scanner's output signal to an integrator or totalizer. As one example, the whole surface of the original could be swept by a scanning spot, with the information coming from central zone Z being processed as described above, and the information coming from zones V and H being segregated out and applied to an integrator to generate the signals DH and DV elucidated above.

Also, whereas reference has repeatedly been made herein to the use of a point-like scanning spot for the scanning of the central zone Z, persons skilled in the art will understand that a single scanning spot is not the only possibility falling within the scope of statements made herein concerning such spot. For example, use could be made of a row of scanning elements extending transverse to the transport direction of the negative, in a way which will be familiar to persons skilled in the art.

The scanning-spot scanning of the central zone Z can be performed with the negative at a standstill or in transport, depending upon the type of scanning mechanism employed.

If the whole-zone density measurements of the foreground and background zones V and H is performed using a compartmental-housing technique, then it might happen that spatial cramping would result from the presence of the scanner used for the central zone Z, or alternatively the whole-zone density measurements if performed with the negative at a standstill might result in a complicated setup if the scanning-spot scanning of zone Z is to be performed with the negative in transport. All this will be understood by the person skilled in the art, and such person will likewise appreciate that, if such difficulties arise, the density measurements of zones V and H could, for example, be performed at one station, followed by transport of the negative in question, followed by scanning-spot scanning of central zone Z at a downstream station, in order to avoid spatial-cramping problems or the like, with signal storage devices being used, if necessary, to make all signals needed for the FIG. 2 circuitry available concurrently.

It will be understood that each of the elements described above, or two or more together, may also find a useful application on other types of circuitry and automatic evaluation techniques differing from the types described above.

While the invention has been illustrated and described as embodied in evaluating developed photographic negatives with respect to printing suitability utilizing a particular zonal subdivision, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of automatically evaluating photographic originals with respect to suitability for copying, comprising the steps of subdividing the image-bearing surface of the originals into a central zone and foreground and background zones;

using photoelectric scanning means of the type producing a small scanning spot to break down the image content of the central zone into constituent surface elements corresponding to the scanning spot and deriving from such constituent surface elements central-zone density signals containing information whose derivation necessitates the break-down of the image content of the central zone into such constituent surface elements;

using photoelectric means to derive from the foreground and background zones respective zonal density signals containing zonal density information whose derivation does not necessitate breakdown of the image content of the foreground and background zones into small constituent surface elements; and applying the zonal density signals and the central-zone density signals to a signal-processing means and using the signal-processing means to generate dont-copy signals in dependence upon the information contained in both the zonal density signals and the central-zone signals, the deriving of the zonal density signals comprising generating a foreground-zone zonal density signal and a background-zone zonal density signal, the deriving of the central-zone density signals comprising generating a central-zone maximum-density signal indicating the density of the maximum-density constituent surface element of the central zone, the generating of don't-copy signals comprising generating a don't-copy signal in dependence upon whether a preselected limit value is exceeded by the difference between, on the one hand, the maximum-density signal and, on the other hand, the smaller one of the foreground-zone zonal density signal and the background-zone zonal density signal.

2. The method defined in claim 1, the generating of don't-copy signals comprising generating a don't-copy-because-underexposed signal if two conditions are concurrently met, the first condition being that the larger one of the foreground-zone zonal density signal and the background-zone zonal density signal does not exceed a preselected limit value, the second condition being that the difference recited in claim 1 not exceed the limit value recited in claim 1.

3. The method defined in claim 2, the deriving of the zonal density signals comprising generating said foreground-zone zonal density signal as a whole-zone density signal indicating the density of the whole of the foreground zone and likewise generating said background-zone zonal density signal as a whole-zone density signal indicating the density of the whole of the background zone.

4. The method defined in claim 2, the generation of don't-copy signals comprising processing the foreground-zone zonal density signal and the background-zone zonal density signal to form an average signal corresponding to the average of the just-mentioned two signals, and generating a don't-copy-because-overexposed signal in dependence upon whether the average signal exceeds a further preselected limit value.

5. The method defined in claim 4, generating the don't-copy-because-overexposed signal in dependence upon whether the average signal exceeds the limit value recited in claim 4 but independently of the density of the central zone.

6. The method defined in claim 4, the generation of don't-copy signals furthermore comprising generating a don't-copy-meaningless-motif signal when said maximum-density signal exceeds a still further preselected limit value.

7. The method defined in claim 6, the density corresponding to the limit value recited in claim 6 being greater than the density corresponding to the limit value recited in claim 4.

8. An apparatus for automatically evaluating photographic originals with respect to suitability for copying, comprising, in combination:

means subdividing the image-bearing surface of the originals into a central zone and foreground and background zones;

photoelectric scanning means of the type producing a small scanning spot operative for breaking down the image content of the central zone into constituent surface elements corresponding to the scanning spot and deriving from such constituent surface elements central-zone density signals containing information whose derivation necessitates the break-down of the image content of the central zone into such constituent surface elements;

photoelectric means deriving from the foreground and background zones respective zonal density signals containing zonal density information whose derivation does not necessitate break-down of the image content of the foreground and background zones into small constituent surface elements; and signal-processing means producing don't-copy signals in dependence upon the information contained in both the zonal density signals and the central-zone signals, the means deriving the zonal density signals comprising means generating a foreground-zone zonal density signal and a background-zone zonal density signal, the means deriving the central-zone density signals comprising means generating a central-zone maximum-density signal indicating the density of the maximum-density constituent surface element of the central zone, the signal-processing means comprising means generating a don't-copy signal in dependence upon whether a preselected limit value is exceeded by the difference between, on the one hand, the maximum-density signal and, on the other hand, the smaller one of the foreground-zone zonal density signal and the background-zone zonal density signal.

9. The apparatus defined in claim 8, the signal processing means comprising means generating a don't-copy-because-underexposed signal if two conditions are concurrently met, the first condition being that the larger one of the foreground-zone zonal density signal and the background-zone zonal density signal does not exceed a preselected limit value, the second condition being that the difference recited in claim 8 not exceed the limit value recited in claim 8.

10. The apparatus defined in claim 9, the means deriving the zonal density signals comprising means generating said foreground-zone zonal density signal as a whole-zone density signal indicating the density of the whole of the foreground zone and likewise generating said background-zone zonal density signal as a whole-zone density indicating the density of the whole of the background zone.

11. The apparatus defined in claim 9, the signal-processing means comprising means processing the foreground-zone zonal density signal and the background-zone zonal density signal to form an average signal corresponding to the average of the just-mentioned two signals and generating a don't-copy-because-overexposed signal in dependence upon whether the average signal exceeds a further preselected limit value.

12. The apparatus defined in claim 11, the means generating the don't-copy-because-overexposed signal doing so independently of the density of the central zone.

13. The apparatus defined in claim 11, the signal-processing means furthermore comprising means generating a don't-copy-meaningless-motif signal when said maximum-density signal exceeds a still further preselected limit value.

14. The apparatus defined in claim 13, the density corresponding to the limit value recited in claim 13 being greater than the density corresponding to the limit value recited in claim 11.

15. A method of automatically evaluating photographic originals with respect to suitability for copying, comprising the steps of
subdividing the image-bearing surface of the originals into a central zone and foreground and background zones;
using photoelectric means to derive from the foreground and background zones respective zonal density signals containing zonal density information whose derivation does not necessitate break-down of the image content of the foreground and background zones into small constituent surface elements, including a foreground zonal density signal and a background zonal density signal; and
applying the foreground and background zonal density signals to a signal-processing means and using the signal-processing means to generate a don't-copy-because-overexposed signal in dependence upon the average of the foreground and background zonal density signals,
generating the don't-copy because-overexposed signal when the average of the foreground and background zonal density signals exceeds one preselected limit value,
furthermore comprising the steps of
using photoelectric scanning means of the type producing a small scanning spot to break down the image content of the central zone into constituent surface elements corresponding to the scanning spot and deriving from such constituent surface elements a maximum-density signal indicating the density of the maximum-density one of the constituent surface elements;
using said signal-processing means to generate a don't-copy-meaningless-motif signal when said maximum-density signal exceeds a further preselected limit value.

16. The method defined in claim 15 the density corresponding to said further limit value being greater than the density corresponding to said one limit value.

17. A method of automatically evaluating photographic originals with respect to suitability for copying, comprising the steps of
subdividing the image-bearing surface of the originals into a central zone and at least one zone surrounding the central zone;
using photoelectric scanning means of the type producing a small scanning spot to break down the image content of the central zone into constituent surface elements corresponding to the scanning spot and deriving from such constituent surface elements a maximum-density signal indicating the density of the maximum-density one of the constituent surface elements; and
applying the maximum-density signal to a signal-processing means and using the signal-processing means to generate a don't-copy-meaningless-motif signal when the maximum-density signal exceeds a preselected limit value.

18. An apparatus for automatically evaluating photographic originals with respect to suitability for copying, comprising, in combination,
means subdividing the image-bearing surface of the originals into a central zone and foreground and background zones;
photoelectric means deriving from the foreground and background zones respective zonal density signals containing zonal density information whose derivation does not necessitate break-down of the image content of the foreground and background zones into small constituent surface elements, including a foreground zonal density signal and a background zonal density signal; and
signal-processing means generating a don't-copy-because-overexposed signal in dependence upon the average of the foreground and background zonal density signals,
the means generating the don't-copy-because-overexposed signal generating that signal when the average of the foreground and background zonal density signals exceeds one preselected limit value,
furthermore comprising
photoelectric scanning means of the type producing a small scanning spot operative for breaking down the image content of the central zone into constituent surface elements corresponding to the scanning spot and deriving from such constituent surface elements a maximum-density signal indicating the density of the maximum-density one of the constituent surface elements;
said signal-processing means comprising means generating a don't-copy-meaningless-motif signal when said maximum-density signal exceeds a further preselected limit value.

19. The apparatus defined in claim 18, the density corresponding to said further limit value being greater than the density corresponding to said one limit value.

20. An apparatus for automatically evaluating photographic originals with respect to suitability for copying, comprising, in combination,
means subdividing the image-bearing surface of the originals into a central zone and at least one zone surrounding the central zone;
photoelectric scanning means of the type producing a small scanning spot operative for breaking down the image content of the central zone into constituent surface elements corresponding to the scanning spot and deriving from such constituent surface elements a maximum-density signal indicating the density of the maximum-density one of the constituent surface elements; and
signal-processing means generating a don't-copy-meaningless-motif signal when the maximum-density signal exceeds a preselected limit value.

21. A method of automatically evaluating photographic originals with respect to suitability for copying, comprising the steps of subdividing the image-bearing surface of the originals into a central zone and foreground and background zones; using photoelectric means to derive from the foreground and background zones respective zonal density signals containing zonal density information whose derivation does not necessitate break-down of the image content of the foreground and background zones into small constituent surface elements, including a foreground zonal density signal and a background zonal density signal; and applying the foreground and background zonal density signals to a signal-processing means and using the signal-processing means to generate a don't-copy-because-over-exposed signal exclusively in dependence upon the average of the foreground and background zonal density signals, irrespective of the density of the central zone, when said average of the foreground and background zonal density signals exceeds a preselected limit value.

22. An apparatus for automatically evaluating photographic originals with respect to suitability for copying, comprising, in combination; means subdividing the image-bearing surface of the originals into a central zone and foreground and background zones; photoelectric means deriving from the foreground and background zones respective zonal density signals containing zonal density information whose derivation does not necessitate break-down of the image content of the foreground and background zones into small constituent surface elements, including a foreground zonal density signal and a background zonal density signal; and signal-processing means generating a don't-copy-because-overexposed signal in dependence upon the average of the foreground and background zonal density signals, but independently of the density of the central zone.

23. An apparatus for automatically evaluating photographic originals with respect to suitability for copying, comprising, in combination; means subdividing the image-bearing surface of the originals into a central zone and foreground and background zones; photoelectric means deriving from the foreground and background zones respective zonal density signals containing zonal density information whose derivation does not necessitate break-down of the image content of the foreground and background zones into small constituent surface elements, including a foreground zonal density signal and a background zonal density signal; and signal-processing means generating a don't-copy-because-overexposed signal in dependence upon the average of the foreground and background zonal density signals, when said average of the foreground and background zonal density signals exceeds a preselected limit valve, but independently of the density of the central zone.

* * * * *